A. L. RISLEY.
WHEEL FENDER.
APPLICATION FILED JULY 18, 1916.
1,200,240.
Patented Oct. 3, 1916.
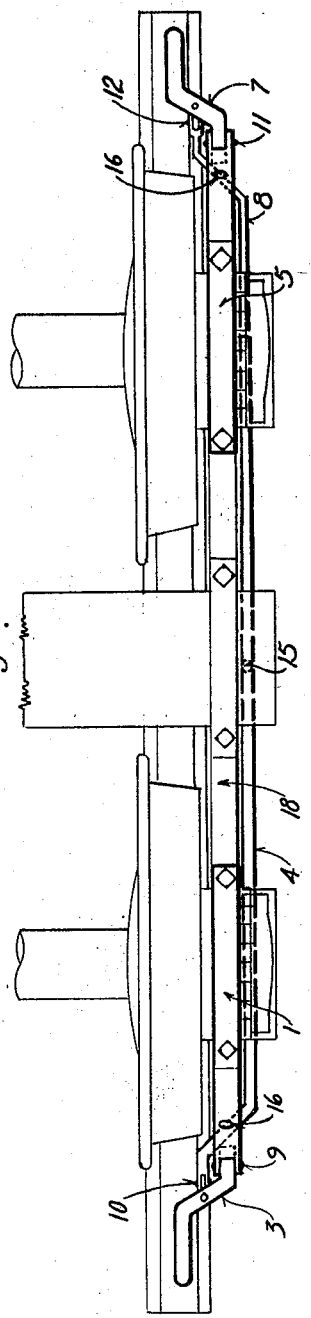
Fig. I.
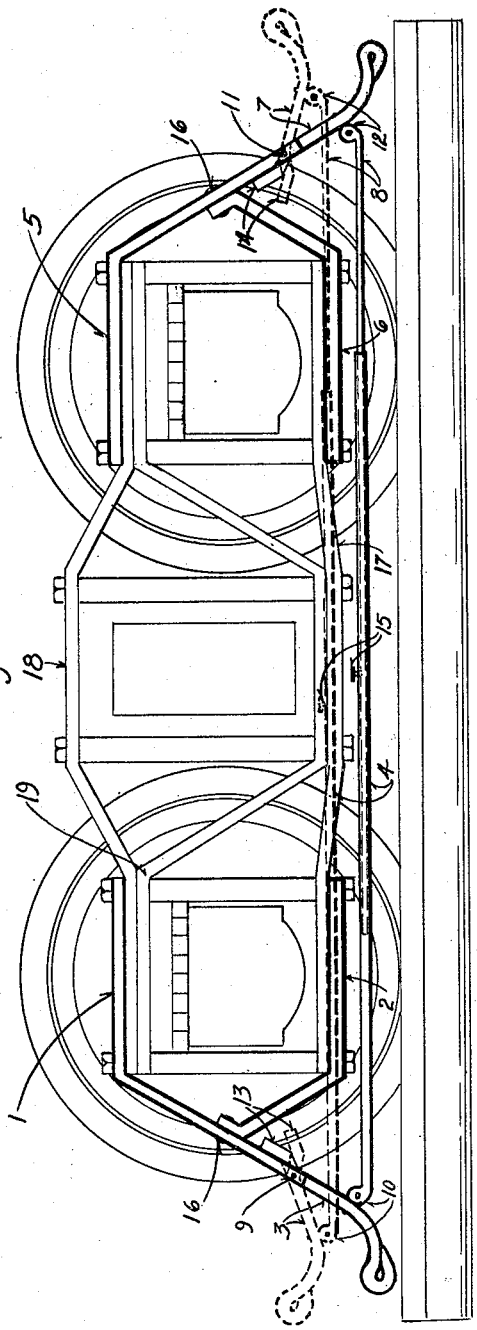
Fig. II.
WITNESSES
John Dean
G. A. Johnson
INVENTOR
Arthur L. Risley

UNITED STATES PATENT OFFICE.

ARTHUR L. RISLEY, OF NICKERSON, KANSAS.

WHEEL-FENDER.

1,200,240.  Specification of Letters Patent.  Patented Oct. 3, 1916.

Application filed July 18, 1916. Serial No. 109,899.

*To all whom it may concern:*

Be it known that I, ARTHUR L. RISLEY, a citizen of the United States, residing at Nickerson, in the county of Reno and State of Kansas, have invented a new and useful Improvement in Wheel-Fenders, of which the following is a specification.

My invention is a wheel fender for railway trucks. Its chief functions are to clear the track of obstructions which might endanger the car of which the truck forms a part, and to save from the wheels persons who may fall on or beside the track.

In carrying out my invention I have produced a device of the character stated which can be easily attached to a truck of the usual construction without modification of the same, and can be readily shifted from operative to inoperative arrangement when necessary to leave the track near the wheel clear for the use of a pinch-bar.

The construction and operation of my device are readily understood by one familiar with this art, from the drawings, in which—

Figure 1 is a top plan view of a portion of a truck with my invention attached, and Fig. 2 is an elevation of the same.

A number of structures illustrated, such as the wheels, and rails, are not specifically referred to for the reason that they form no part of my invention, being shown for the purpose of making clear its operative relations thereto.

As shown, the present embodiment of my invention comprises two identically formed supports 1 and 5, two identically formed braces 2 and 6, two end guards 3 and 7, the telescoping members 4 and 8 and means for suitably securing them in assembled relations.

The braces 2 and 6 are respectively secured to the supports 1 and 5 by rivets 16 or other suitable means. The end guard 3 is hinged to the support 1 by the pivot 9, the lower end of the support being bifurcated to receive the guard and is provided with the offset portion 13 extending upward beyond the pivot so as to limit by contact with the support, the downward motion of the guard 3. This member is offset laterally in its lower portion toward the median line of the truck in order to bring its active portion immediately over the rail, and its lower end is near the rail but not in contact therewith. Similarly, the end guard 7 is connected to the support 5 by the pivot 11, is provided with the stop portion 14 and is offset to bring its lower end over the rail.

The telescoping members 4 and 8 are respectively secured to members 3 and 7 by pivot joints 10 and 12. By means of the joints at 9, 10, 11, and 12, and the telescopic relations noted, the members 3, 4, 7, and 8 may be raised as shown in dotted lines in Fig. 2 so as to leave the track clear for the use of a pinch-bar when so desired. A set screw 15 extends through the wall of member 4 for securing members 4 and 8 in any position to which they may be adjusted. These telescoping members form conjointly a support for the guards 3 and 7 when they are in elevated position or a tie when they are in operative position and also constitute a lateral guard against bodies falling across the track from points just outside the wheels. The supports 1 and 5 extend over the oil boxes, the braces 2 and 6 extend below the same and all are secured to the arch bars 18 and 19 and the stay bar 17 of the truck by the usual oil box bolts as shown.

In applying my device, the only change from the regular construction required is that in some cases longer oil box bolts must be substituted for those in use.

By the disclosure of this construction it is seen that my fender is reliably secured to the truck, and that it is convenient in attachment, simple in structure, and effective in action.

I claim:—

1. A fender for a railway truck comprising a support and a guard, said support being adapted to be secured to the truck by the oil box bolts of the same, and said guard being pivotally connected to said support so as to rotate in a vertical plane, and provided with a stop to limit its downward rotation.

2. A fender for a railway truck comprising a support, a brace, and a guard; said support and brace being rigidly secured together and adapted to be secured to the truck by the oil box bolts of the same, and said guard being pivotally connected to said support on a horizontal axis and provided with means coacting with said support to limit the downward rotation of said guard.

3. A fender for a railway truck comprising two supports, two end guards, and a lateral guard, said supports being adapted to be attached to the arch bar of the truck at the opposite ends of said bar, said end guards pivotally connected with said supports respectively, and said lateral guard adjustably connecting said end guards.

4. In combination with the arch bar of a railway truck, a support at each end of said bar, a guard depending from each of said supports and pivotally secured thereto on a horizontal axis, rigid means adjustable in length connecting said guards and movably secured thereto.

5. In combination with the arch bar of a railway truck, a support at each end of said bar, a guard depending from each of said supports and pivotally secured thereto on a horizontal axis, rigid means adjustable in length connecting said guards and movably connected thereto, said connecting means forming a lateral guard against bodies falling between the wheels.

6. In combination with a railway truck, end guards movably connected with said truck and a longitudinally adjustable lateral guard extending between said end guards and movably secured thereto.

7. In combination with a railway truck, end guards movably connected with said truck, a lateral guard extending between said end guards and movably secured thereto, said lateral guard being adjustable in length and adapted to hold said end guards in different positions of adjustment.

ARTHUR L. RISLEY.

Witnesses:
A. T. WRAY,
H. E. FLEMING.

Copies of this patent may be obtained for five cents each, by addressing the "Commissioner of Patents, Washington, D. C."